US012140022B1

(12) United States Patent
Jackson et al.

(10) Patent No.: US 12,140,022 B1
(45) Date of Patent: *Nov. 12, 2024

(54) DOWNHOLE SAFETY SWITCH AND COMMUNICATION PROTOCOL

(71) Applicant: Acuity Technical Designs, LLC, Phoenix, AZ (US)

(72) Inventors: Roger Jackson, Glendale, AZ (US); Brian Keith Roper, Phoenix, AZ (US); Todd K. Roper, Glendale, AZ (US)

(73) Assignee: Acuity Technical Designs, LLC, Phoenix, AZ (US)

( * ) Notice: Subject to any disclaimer, the term of this patent is extended or adjusted under 35 U.S.C. 154(b) by 192 days.

This patent is subject to a terminal disclaimer.

(21) Appl. No.: 17/689,618

(22) Filed: Mar. 8, 2022

Related U.S. Application Data

(63) Continuation-in-part of application No. 16/367,101, filed on Mar. 27, 2019, now Pat. No. 11,268,376.

(51) Int. Cl.
*E21B 47/12* (2012.01)
*E21B 43/1185* (2006.01)
*H04L 27/10* (2006.01)

(52) U.S. Cl.
CPC ........... *E21B 47/12* (2013.01); *E21B 43/1185* (2013.01); *H04L 27/10* (2013.01)

(58) Field of Classification Search
CPC ....... E21B 47/12; E21B 43/1185; H04L 27/10
See application file for complete search history.

(56) References Cited

U.S. PATENT DOCUMENTS

| | | | | |
|---|---|---|---|---|
| 5,259,466 | A | * 11/1993 | Venditto | E21B 43/119 175/4.51 |
| 2002/0163441 | A1 | * 11/2002 | Hill | E21B 47/13 340/854.3 |
| 2005/0001734 | A1 | * 1/2005 | Miller, Jr. | E21B 47/12 340/853.1 |
| 2012/0193143 | A1 | * 8/2012 | Hill | E21B 47/024 175/4.51 |
| 2016/0230546 | A1 | * 8/2016 | Braisher | E21B 47/13 |
| 2016/0369622 | A1 | * 12/2016 | Wheeler | E21B 47/12 |
| 2019/0112917 | A1 | * 4/2019 | Disko | E21B 47/13 |
| 2020/0088026 | A1 | * 3/2020 | Buternowsky | H04L 27/206 |
| 2020/0109624 | A1 | * 4/2020 | Parasram | H04B 1/38 |
| 2020/0378222 | A1 | * 12/2020 | Phelps | F42D 1/05 |

* cited by examiner

*Primary Examiner* — Amine Benlagsir
(74) *Attorney, Agent, or Firm* — SNELL & WILMER L.L.P.

(57) ABSTRACT

A system includes a surface device, preferably positioned on a surface, a downhole device, and a wireline communications system. A downlink communication between the surface device and the downhole device occurs via Hopped Frequency Shift Keying (HFSK) voltage-modulated signals. An optional uplink communication between the downhole device and the surface device may occur via Frequency Shift Keying (FSK) current-modulated signals. The downhole device may comprise an addressable switch.

15 Claims, 12 Drawing Sheets

DOWNHOLE SAFETY SWITCH AND COMMUNICATION PROTOCOL

CROSS REFERENCE TO RELATED APPLICATIONS

This application is a continuation-in-part of and claims priority to and benefit of U.S. patent application Ser. No. 16/367,101 titled, "DOWNHOLE SAFETY SWITCH AND COMMUNICATION PROTOCOL" filed, Mar. 27, 2019. All of the contents of the previously identified application are hereby incorporated by reference for any purpose in their entirety.

FIELD

The present disclosure relates to addressable communications, including those for wireline perforating of wellbores.

BACKGROUND

The disclosures of the following U.S. Patent Applications are incorporated by reference into this Application: (1) U.S. application Ser. No. 16/293,492 entitled Downhole Plunger and Subassembly and filed on Mar. 5, 2019, (2) U.S. application Ser. No. 16/293,508 entitled Downhole Perforating Gun Tube and Components and filed on Mar. 5, 2019, (3) U.S. application Ser. No. 16/293,522 entitled End Fitting For Downhole Perforating Gun Tube and filed on Mar. 5, 2019, (4) U.S. application Ser. No. 16/293,528 entitled Double Wire Feed Through For Downhole Subassembly and filed on Mar. 5, 2019, and (5) U.S. application Ser. No. 16/293,532 entitled Intelligent Downhole Perforating Gun Tube and Components and filed on Mar. 5, 2019. The inventors for each of applications (1)-(5), above, are Dawna Mauldin, Ronald Haasl, and Keith Roper. Also incorporated herein by reference is U.S. application Ser. No. 17/228,692 entitled DOWNHOLE GUN TUBE EXTENSION, filed on Apr. 12, 2021, the inventors of which are Brian Keith Roper and Todd K. Roper.

When drilling oil or gas wells, a wellbore is formed. The wellbore may be horizontal or lateral. After drilling, the drill string and bit are removed and the remaining wellbore is lined with a metal casing. A generally annular area is typically formed between the outside surface of the metal casing and the surrounding formations.

A cementing operation is typically conducted to fill the area between the metal casing and the surrounding formation with concrete. The combination of concrete and metal casing strengthens the wellbore.

Later, perforations are usually made in the metal casing and concrete using a perforating gun assembly that is generally comprised of a steel carrier, and a charge tube inside of the carrier with shape charges positioned in the charge tube. The perforating gun is positioned into the wellbore and is typically connected to an electric wireline until it is at a predetermined position. Then a signal actuates a firing head of the gun, which detonates the shaped charges in the gun. The explosion of the shaped charges perforates the metal casing and concrete to allow fluids to flow from the formation into the wellbore.

SUMMARY

A system, method, and devices related to wireline perforating of wellbores is disclosed herein. The system comprises a control device that is preferably on the surface (which is sometimes referred to herein as "surface device, even though it need not be positioned on the surface), a downhole device, and a wireline communications system including an addressable switch coupled to a downhole device, wherein the addressable switch comprises a first unique ID. The downlink communication between the surface device and the downhole device may occur via Hopped Frequency Shift Keying (HFSK) voltage-modulated signals. The addressable switch may be configured to communicate the first unique ID to the surface device in response to a signal from the surface device.

In various embodiments, the addressable switch comprises a second unique ID and is configured to transmit the second unique ID in response to the signal from the surface device. In various embodiments, the addressable switch is configured to generate orientation data based on input from one or more sensors and to transmit the orientation data to the surface device. In various embodiments, the addressable switch is configured as a safe and arm device for a first detonator of the downhole device and a second detonator of a second downhole device wherein the first unique ID is associated with the first detonator and the second unique ID is associated with the second detonator.

The surface device may comprise a controller configured to send downlink communication signals to a downhole device. The controller may be a master controller. The surface device may be a master controller, wherein the downhole device is a slave. Downlink communication between the surface device and the downhole device may occur via Hopped Frequency Shift Keying (HFSK) voltage-modulated signals.

The uplink communication between the downhole device and the surface device may occur via Frequency Shift Keying (FSK) current-modulated signals. The downhole device may comprise an addressable switch. The downhole device may be a gun tube comprising one or more shape charges, one or more detonators, and one or more addressable switches. The wireline communication system may be a half-duplex. The wireline communications system may comprise a single wire downhole and a case or chassis for a return current path. The downlink communication may use voltage modulation at four different frequencies. A transport layer may comprise a bit-stream with a Preamble, Sync, and Data Packet, wherein the Data Packet consists of Type, Address, Sequence, Command, Data, and Hash fields, and wherein the Command comprises one of the following: request device ID and version; Poll device for status; Downstream Switch Enable (DSSE); ARM Detonator; and FIRE. The HFSK may alternate between four frequencies, F1, F2, F3, and F4, with a change in frequency indicating a new bit, and wherein frequencies F1 and F2 are utilized for a Zero bit, and wherein frequencies F3 and F4 are utilized for a One bit, excepting during the Preamble and Sync patterns.

An addressable switch is disclosed herein, which may be utilized in applications other than the perforating of wellbores. The addressable switch preferably comprises an electrical input and an electrical output, a downstream switch, a safety circuitry, and a processor. The electrical input may be configured to communicate with a controller, which is preferably above the surface of the ground, when a unique address is received by the electrical input from the surface device. The downstream switch may be configured to connect or disconnect to the electrical output when a command with the unique address is received by the electrical input. The processor may be in electrical communication with the downstream switch and the safety circuitry. The switch may include a tangible, non-transitory memory configured to communicate with the processor, the tangible, non-transitory memory having instructions stored thereon that, in response to execution by the processor, cause the processor to perform operations comprising, receiving a signal from the surface controller, sending a signal to the safety circuitry to arm a detonator, and generating orientation data. Downlink communication between the surface device and the electrical input occur via voltage-modulated signals, preferably via Hopped Frequency Shift Keying (HFSK) voltage-modulated signals.

The downlink communication preferably uses voltage modulation at four different frequencies. A transport layer may comprise a bit-stream with a Preamble, Sync, and Data Packet, wherein the Data Packet consists of Type, Address, Sequence, Command, Data, and Hash fields, wherein the HFSK alternates between four frequencies, F1, F2, F3, and F4, with a change in frequency indicating a new bit, and wherein the Command comprises one of the following: request device ID and version; Poll device for status; Downstream Switch Enable (DSSE); ARM Detonator; and FIRE. The frequencies F1 and F2 may be utilized for a Zero bit. Frequencies F3 and F4 may be utilized for a One bit, except during the Preamble and Sync patterns. The addressable switch may further comprise an oscillator configured to be tuned to a reference signal, where the preamble provides the reference signal based on a minimum frequency deviation from a plurality of frequency deviations between an expected frequency from a surface controller and an internally generated frequency in the oscillator.

In various embodiments, the downlink communication uses voltage modulation at four different frequencies. A transport layer may comprise a bit-stream with a Preamble, Sync, and Data Packet, wherein the Data Packet consists of Type, Address, Sequence, Command, Data, and Hash fields. The HFSK may alternate between four frequencies, F1, F2, F3, and F4, with a change in frequency indicating a new bit, wherein frequencies F1 and F2 are utilized for a Zero bit, and wherein frequencies F3 and F4 are utilized for a One bit, except during the Preamble. The Command may comprise one of the following: request device ID and version; Poll device for status; Downstream Switch Enable (DSSE); ARM Detonator; and FIRE.

DETAILED DESCRIPTION OF PREFERRED EMBODIMENTS

Figure 1:
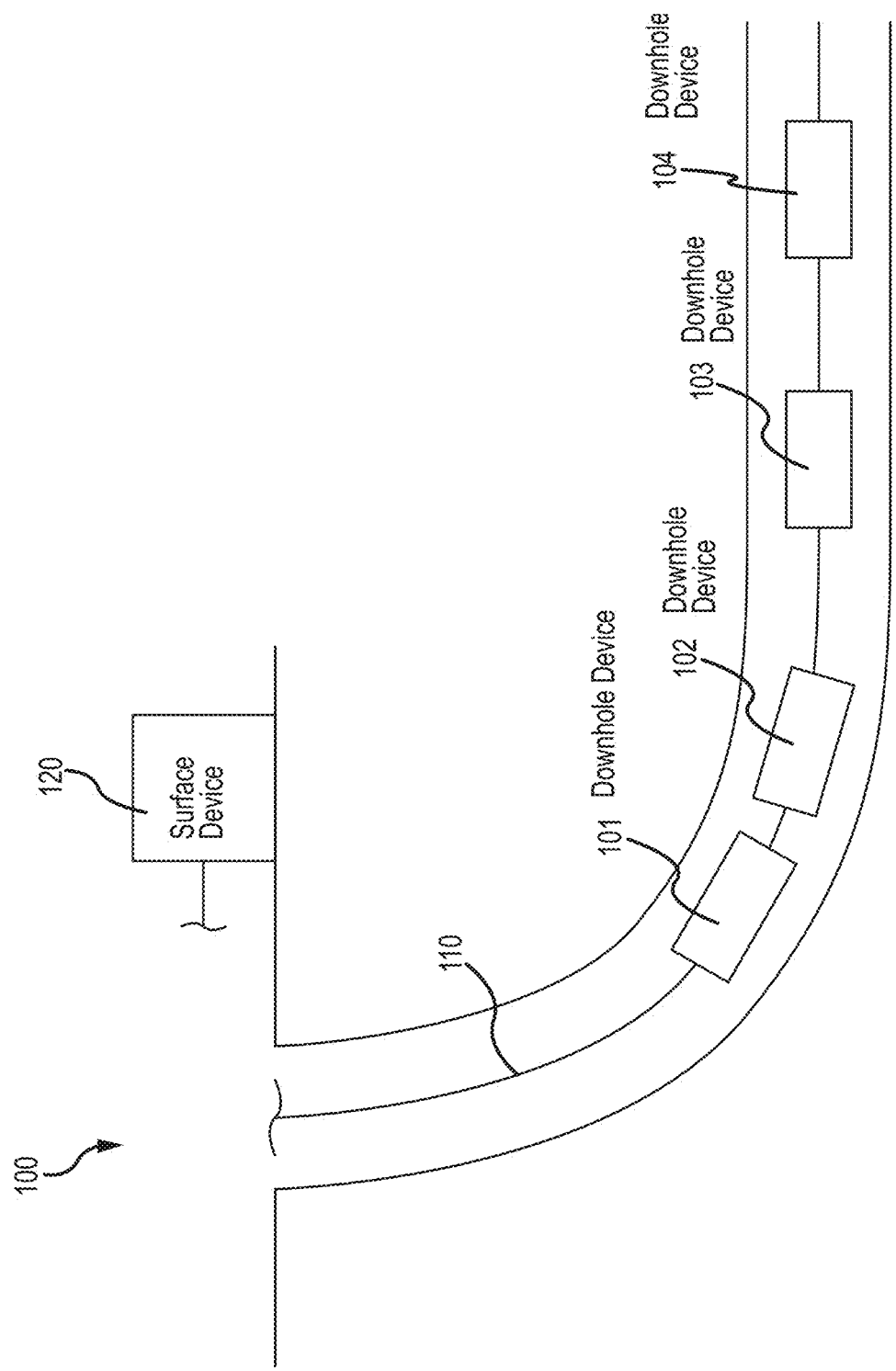
FIG. 1 is a side view of a well boring system in accordance with aspects of this disclosure.

Turning now to the drawings, where the purpose is to describe embodiments of this disclosure and not to limit the claims, FIG. 1 shows a well boring system 100.

Downhole Drilling

In an example well boring operation, a well boring system 100 comprises a surface device 120 that communicates with a downhole device 101 via a wireline communication system 110. In this example embodiment, downlink communication between surface device 120 and downhole device 101 occurs via Hopped Frequency Shift Keying (HFSK) voltage-modulated signals. In a further example embodiment, uplink communication between downhole device 101 and surface device 120 occurs via Frequency Shift Keying (FSK) current-modulated signals.

Surface Device

In this example embodiment, surface device 120 may be physically located above the surface of the ground, whereas downhole device 101 may be configured to be positioned in a well bore, although it may be at any suitable position and even below the surface level. Surface device 120 may comprise a surface controller. In an example embodiment, the surface device 120 operates as a master controller and the downhole devices (e.g., 101, 102, 103, 104) are slave nodes.

In an example embodiment, the surface device 120 is configured to send downlink communication signals to downhole device 101. The downlink communications signals may comprise such commands as: identify, status, enable switch, ARM detonator, and FIRE detonator. Moreover, the downlink communication signals may comprise any suitable commands, queries, or otherwise. In another example embodiment, the surface device 120 is configured to receive uplink communications signals from the downhole device 101 such as: temperature data, device identification and version, status information, acknowledgements of commands, and/or the like, although such uplink communication signals need not be sent. In an example embodiment, surface device 120 can comprise a single device or several devices. For example, surface device 120 may comprise a low power only surface box, a third-party controller with a combined shooting panel, or the like. In an example embodiment, the surface device 120 is configured to control and provide power to both a tractor and a gun (i.e., shooting power). In this example embodiment, the system 100 is preferably configured to prevent these power sources from being applied accidently.

Downhole Device

In one example embodiment, downhole device 101 may be a gun tube for performing wireline perforation in boring operations. The gun tube is preferably cylindrical and formed of steel. In this embodiment, the gun tube may comprise a tube body including a shape charge and a detonator. For example, downhole device 101 may comprise an exploding-bridgewire detonator (EBD)(fired using an electric current), exploding foil initiator detonator (EFD), and Rig Environment Detonator (RED). The downhole device 101 may comprise an initiator such as an exploding foil "flyer plate" initiator, exploding foil "bubble activated" initiator, semiconductor bridge initiator (SCB), or the like.

Downhole device 101 may instead be other devices such as a setting tool, retrieving tool, a plugging operation, and the like. Other downhole devices that may be used include smart devices, components, or intelligent tools, such as a Casing Collar Locator (CCL) logging tool, a temperature logging tool, a pressure logging tool, a gamma ray logging tool, a neutron logging tool, a radioactive tracer tool, a pulse tool type production logging tool, a gravel pack logging tool, etc.

In an example embodiment, system 100 may comprise more than one downhole device. For example, system 100 may comprise downhole device 101, downhole device 102, downhole device 103, and downhole device 104. Moreover, system 100 may comprise any suitable number of downhole devices. In embodiments with multiple downhole devices, the downhole devices may be connected physically, and/or electrically, in series. This series of downhole devices is also referred to herein as a toolstring. The toolstring may refer to the entire line of downhole devices and downstream toolstring may refer to a portion of an entire line of downhole devices, which portion is located below a specified point.

In an example embodiment, the downhole device 101 may be configured to receive downlink communication signals from surface device 120. The downlink communications signals may comprise such commands as: Identify, Status, Enable Switch, ARM Detonator, and FIRE Detonator. Moreover, the downlink communication signals may comprise any suitable commands, queries, or otherwise. In another example embodiment, the downhole device 101 may be configured to send any suitable uplink communications signals from the downhole device to the surface device 120, such as one or more of: temperature data, device identification and version, status information, acknowledgements of commands, and/or the like. This may provide a user with the advantage of obtaining downhole device data, while the downhole device 101 is below the surface. Downhole device 101 does not need to be removed from a wellbore to obtain this data.

Addressable Switch

Figure 3:
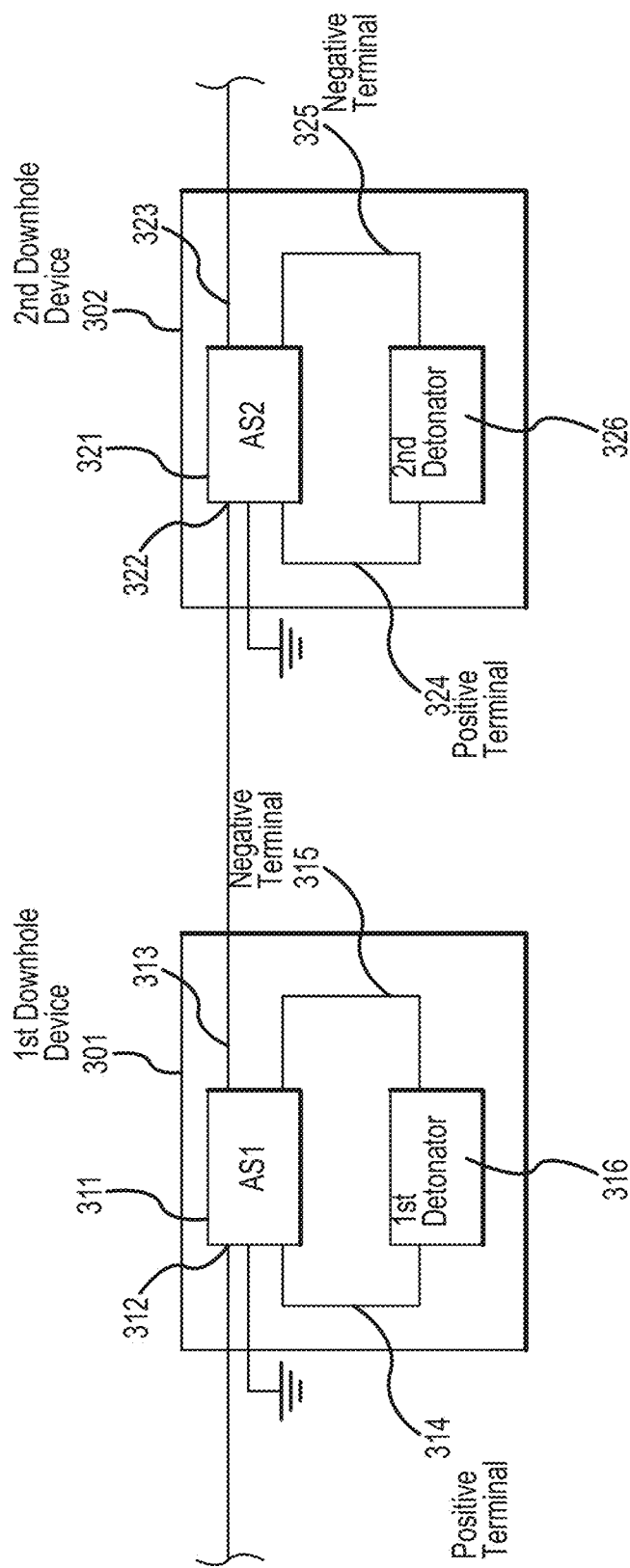
FIG. 3 is a diagram of first and second downhole devices in accordance with aspects of this disclosure.
Figure 4:
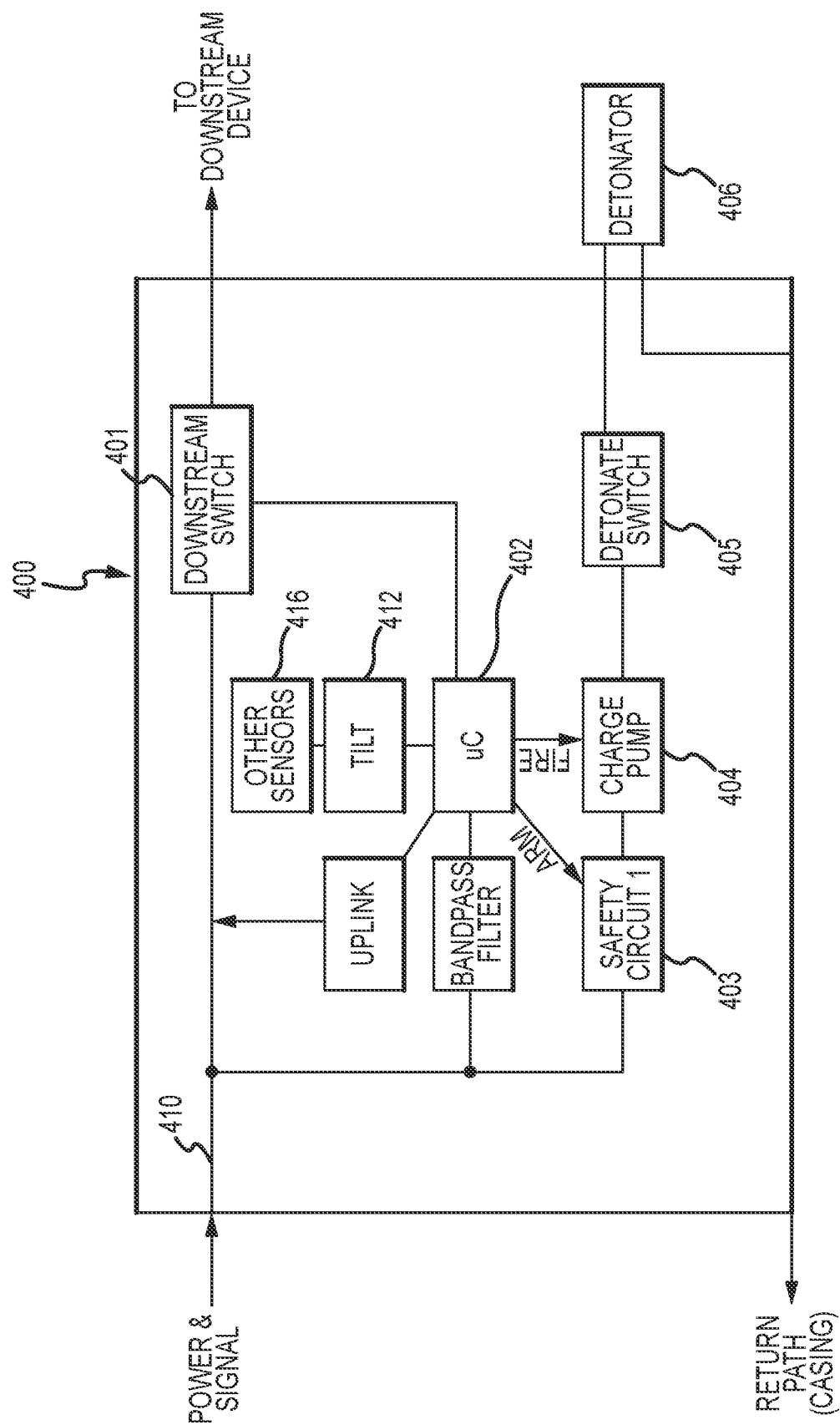
FIG. 4 is a block diagram of an example embodiment of an addressable switch in accordance with aspects of this disclosure.

In an example embodiment, the downhole device may comprise an addressable switch. The addressable switch may be configured to communicate with a controller located at any suitable position, and the controller is preferably surface device 120 for wellbore applications. The surface device 120 and the addressable switch are configured to communicate via a wire. With reference now to FIG. 3, in an example embodiment, a first downhole device 301 comprises a first addressable switch 311 ("AS1") and a first detonator 316, and a second downhole device 302 comprises a second addressable switch 321 ("AS2") and a second detonator 326. When a proper command is sent, the first addressable switch 311 may be configured to connect or disconnect the electrical feed-through to the second downhole device 302. In other words, the addressable switch may be configured to connect or disconnect the electrical communication path to the next downhole device in the wireline.

In an example embodiment, the first addressable switch 311 may have an electrical input 312 and an electrical output 313. Electrical input 312 may provide communication from surface device 120, as previously described. Electrical input 312 may receive a signal to command first addressable switch 311 to change from a 'blocking' state to a 'connecting' state. When the first addressable switch 311 is in a connecting state, it may provide an electrical path to the second downhole device 302, which as shown is downstream of first downhole device 301. The electrical path may extend from an electrical output 313 of first addressable switch 311 to an electrical input 322 of a second addressable switch 321. First addressable switch 311 may be configured to go into a sleeping mode when it is in a 'connecting' state. By having addressable switch 311 in a sleeping mode while it is in a 'connecting' state, the system may ensure that the surface device 120 is only communicating with one first addressable switch at a time. For example, when first addressable switch 311 is in a 'connecting' state, and the second addressable switch 321 is in a 'blocking state,' the surface device 120 may exclusively communicate with second downhole device 302. Alternatively, when first addressable switch 311 is in a 'blocking' state, the surface device 120 may exclusively communicate with first addressable switch 311.

When first addressable switch 311 is in a 'blocking state,' the surface device 120 communicates a detonate signal to the first addressable switch 311. Upon receiving a detonate signal, first addressable switch 311 detonates the detonator 316 via the positive terminal 314 and negative terminal 315. When first addressable switch 311 is in a 'connecting state,' the surface device 120 communicates a detonate signal to the second addressable switch 321. Upon receiving a detonate signal, second addressable switch 321 detonates the detonator 326 via the positive terminal 324 and negative terminal 325. In like manner, second addressable switch 321 may be configured to communicate with subsequent downstring addressable switches, such as a third addressable switch and/or fourth addressable switch, neither of which are shown in the figures.

As described above, the system 100 may comprise a line of downhole devices. In this example embodiment, each downhole device comprises its own addressable switch, and each addressable switch has a unique address and is configured to be uniquely identifiable (as explained further below) by transmitting a unique signal. In another example embodiment, the addressable switch is configured to be commanded individually by the surface device 120, and/or to reply back to the surface device 120. Each explosive charge in a gun tube may be associated with one addressable switch and that addressable switch's unique address.

Each addressable switch is preferably configured to safely manage downhole wireline shooting in the mining industry. If the downhole device is an explosive device, such as a gun tube, each downhole device may comprise at least one shaped charge, detonator, and an addressable switch.

The addressable switch preferably prevents the accidental application of power to any downhole device located beneath the addressable switch, and the addressable switch can be integrated into a variety of toolstring configurations. Toolstring configurations can include specific logging tools such as Casing Collar Locators (CCLs), Tension Tools, and the like. Thus, by addressing one of the addressable switches at its unique address, the other addressable switches are not addressed, which provides safety by not accidentally communicating with other than the intended addressable switch. The addressable switch may be configured to electrically connect or isolate the toolstring beneath it, as instructed by the surface device 120.

Communications Protocol

In accordance with an example embodiment, the system 100 comprises a wireline communications system. In this example embodiment, the downlink communication between surface device 120 and downhole device 101 (or multiple devices 101, 102, 103, 104, etc.) occurs via Hopped Frequency Shift Keying (HFSK) voltage-modulated signals.

In a further example embodiment, uplink communication between the downhole device 101 (or multiple devices 101, 102, 103, 104, etc.) and the surface device 120 occurs via Frequency Shift Keying (FSK) current-modulated signals. In one example embodiment, the downlink and uplink communications are half-duplex. In another example embodiment, the wireline system can be either positive polarity or negative polarity. Thus, in an example embodiment, the addressable switch may be configured to perform safe and secure half-duplex communications with HFSK downlink and FSK uplink communications; perform enable/disable communications with lower downhole devices; and perform enable/disable detonator operations for firing.

The wireline communications system preferably comprises a single wire downhole and uses the casing or other metal structure of the downhole device as the return current path. Thus, the single wire downhole connects the surface device 120 and the downhole device 101 forming an electrical connection between the surface device 120 and the downhole device 101 and forming a return path through, for example, the metal casing of the downhole device.

Frequency Shift Keying (FSK)

In an example embodiment, the uplink signals are performed via 20 mA current modulation at the two frequencies of 2.0 KHz and 3.333 KHz. In this example embodiment, the time per bit is 3.0 mS, and the effective baud rate is 333 bps. In this example embodiment, the uplink communication is standard FSK with Manchester encoding and the frequencies are chosen such that a whole number of cycles exist within one-half bit time. However, any suitable FSK topology may be used.

Hopped Frequency Shift Keying (HFSK)

In an example embodiment, the downlink communication uses voltage modulation at four different frequencies, hereafter referred to as F1, F2, F3, and F4. Thus, the Hopped FSK (HFSK) alternates between four frequencies, F1, F2, F3, and F4, with a change in frequency indicating a new bit. In one embodiment, frequencies F1 and F2 are utilized for a Zero bit, and frequencies F3 and F4 are utilized for a One bit, except during the preamble and sync patterns at the start of the message. Although a four frequency communication protocol is disclosed herein, any suitable HFSK protocol may be used.

In one example embodiment, the frequencies utilized are 2.0 KHz, 2.4 KHz, 2.8 KHz, and 3.2 KHz. In this example embodiment, the time per bit is 2.5 mS, the effective baud rate is 400 bps, and the frequencies are chosen such that there are a multiple of full frequency cycles within one bit time. In this example, there are eight full cycles for the 3.2 KHz frequency, seven full cycles for the 2.8 KHz frequency, six full cycles for the 2.4 KHz frequency, and five full cycles for the 2.0 KHz frequency. Rather than using zero-crossing detection of the signal and determining the frequency via time between zero crossings, in an example embodiment a more advanced digital signal processing (DSP) technique may be used. The more advanced DSP technique may comprise using signal correlation, where ideal waveforms of the frequencies of interest are generated by the processor and compared to the incoming digitized waveform. In this example embodiment, an entire data bit, one for each frequency, is generated which comprises from 5 to 8 whole sinewave cycles per bit. The number of cycles in one data bit may depend on the frequency. In an example embodiment, a correlation value is obtained by multiplying the incoming waveform against one of the reference (internally generated) waveforms and summing the results of each point-by-point multiplication. By comparing the correlation values for each of the four possible frequencies, the actual incoming frequency, and therefore each bit value, can be determined. The correlation method is much more resilient to noise and signal reflections on the line than the simple zero-crossing method. In this example embodiment, a signal of at least 1.0 Vpp at the board may suffice for solid, reliable communication, and a signal over 5.0 Vpp is safely clipped to 5 volts.

Although HFSK protocol provides various benefits described herein, HFSK is much more difficult to implement than FSK, and requires changes to the transport plan. This difficulty is in part due to the high temperature variation (e.g., ranging from −55C (−67F) up to approximately 175C or 347F) experienced by the downhole device, which causes the oscillator in the downhole device to drift. Drift is acceptable with FSK because with FSK, the center frequency can be found rather simply, regardless of the drift, and the FSK system need only determine if received signal bits are above or below the center frequency to decode the 1's and 0's being transmitted. In contrast, with HFSK, the oscillator may need to be tuned to a reference signal. With HFSK, the center frequency is of little usefulness. Therefore, in an example embodiment, the first 8 bits, i.e., the preamble, provides the reference signal for adjusting the oscillator in the downhole device 101, underground, to match the oscillator in the surface device 120. In an example embodiment, the incoming signal is correlated against several internally-generated signals which have small frequency deviations from the expected F1 frequency. The deviation which best matches the incoming frequency indicates the difference between surface controller and downhole device oscillator frequencies. This difference may then be used to modify the sampling rate of the digitizing process, which causes the incoming signal to match the HFSK frequencies used in the downhole device. Moreover, any suitable method of tuning the local oscillator on the downhole device may be used.

In an example embodiment, HFSK communication increases the reliability of the communication. HFSK makes it more difficult to accidentally actuate the switch or to accidentally actuate the wrong switch. The use of four frequencies in the HFSK protocol increases the reliability of the communication. The four frequencies make possible the use of patterns in the selected communications or the device will not detonate.

Transport Layer

In accordance with various example embodiments, any suitable HFSK communication protocol may be implemented consistent with the present disclosure. However, by way of one example embodiment, a transport layer can be implemented as set forth herein. For example, the transport layer can comprise a bit-stream with a Preamble, Sync, and data Packet. In this example embodiment, the Packet may consist of Type, Address, Sequence, Command, Data, and Hash fields. In this example embodiment, the downlink message may begin with a preamble of 8 bits, a sync period of 4 bits, and the data packet may consist of eighteen (18) 8-bit bytes. This makes for a total message length of 156 bits, or 390 mS. In various embodiments, the downlink message begins with a preamble of 8 bits, a sync period of 4 bits, and includes a data packet consisting of 11 8-bit bytes. In this regard, total message length is 100 bits, or 250 mS.

In accordance with an example embodiment, the Hopped FSK (HFSK) alternates between four frequencies, F1, F2, F3, and F4, with a change in frequency indicating a new bit. In an example embodiment, frequencies F1 and F2 are utilized for a Zero bit, and frequencies F3 and F4 are utilized for a One bit, excepting during the preamble and sync patterns at the start of the message. In this example embodiment, successive Zero bits, whether interspersed with One bits or not, alternate between using F1 and F2, and One bits similarly alternate between using F3 and F4. In the packet portion of the message, the first Zero bit will use F1, and the first One bit will use F3. An example of a simple bit pattern of 10100011 is shown in the below table:

| BIT # | VALUE | FREQUENCY |
|---|---|---|
| 1 | 1 | F3 |
| 2 | 0 | F1 |
| 3 | 1 | F4 |
| 4 | 0 | F2 |
| 5 | 0 | F1 |
| 6 | 0 | F2 |
| 7 | 1 | F3 |
| 8 | 1 | F4 |

In this example embodiment, the HFSK preamble is a steady tone of frequency F1 which lasts for eight (8) bit times. In this example embodiment, the HFSK sync pattern consists of four (4) bit times, using the frequencies F4, F2, F4, F2. This sequence of frequencies violates the HFSK standard described herein, and is therefore unique to the sync field.

This provides for increased security in communication two ways. The first is that bit timing is no longer required to be held in tight tolerance, because the arrival of the next data bit is signaled by the change in carrier frequency. The second is that only two of the four frequencies are valid for the next arriving bit. An incorrectly received/decoded frequency can be detected early, thereby invalidating the message even before the hash check is performed.

In this example embodiment, the FSK uplink message may begin with a preamble of 8 bits, a sync of one bit, and the packet may consist of eighteen (18) 8-bit bytes, for a total message length of 153 bits, or 459 mS. In this example embodiment, the FSK uplink messages use Manchester encoding, such that the first half of each bit is either the upper or lower frequency, and the second half of the bit is the other frequency. Zero bits begin with the lower frequency, and One bits begin with the upper frequency. In this example embodiment, the FSK preamble consists of eight (8) Zero bits. In this example embodiment, the FSK sync is a One bit. In this example embodiment, for FSK, the bit after the first One bit (the sync) marks the start of the packet, and is the most significant bit of the first packet byte.

In this example embodiment, for both FSK and HFSK, within each packet, there is a <Sequence> area intended to be used by the sending program in order to synchronize sent packets with received packets. Therefore, the sending program is configured to keep this a unique value in order to determine how to match up a response with a previously sent command. In this example embodiment, the format of all messages to and from the surface controller and the downhole device are as follows: <PREAMBLE>, <SYNC>, <TYPE>, <ADDRESS>, <SEQUENCE>, <CMD>, <DATA>, and <HASH>. Where:

| TYPE | SIZE (bits) | DESCRIPTION |
|---|---|---|
| PREAMBLE | 8 | Preamble depends on HFSK or FSK modulation |
| SYNC | 1 or 4 | Sync depends on HFSK or FSK modulation |
| TYPE | 8 | Device Type (0x01 = AS-100) |
| ADDRESS | 24 | Unique ID (address) of the Device (0xFFFFFF = broadcast) |
| SEQUENCE | 12 | Sequence number for returned data packet. Allows Master to sync the response with the transmitted packet |
| CMD | 4 | 16 allowable commands per device type. The command bits occupy the low 4 bits of the second Sequence byte |
| DATA | 32 | Data specific to command |
| HASH | 64 | Hash of the data from the TYPE/ADDRESS to the DATA in the packet |

In an example embodiment, the Command may comprise one of the following: request device ID and version; Poll device for status; Downstream Switch Enable (DSSE); Arm Detonator; and Fire. The DSSE command may be configured to cause the downhole device to reply to this command and then sleep after activating a downstream switch. The ARM command may activate safety hardware circuitry to enable the FIRE command. The FIRE command may supply a frequency out to a charge pump circuit, enabling a detonation voltage for up to a programmable "nn" seconds. In various embodiments, following the <DATA> field of each command and each response is the <HASH> field, which is a 16-bit CRC of the packet contents, excluding the preamble and sync bits. The algorithm, in 'C' code, is as follows:

```
uint16 crc (uint8 *s, uint8 n)    // S = pointer to message packet
{                                  // N = number of bytes in packet, excluding
                                   CRC itself
   uint16 crc;
   uint8 byt, i, b;
   crc = 0;                        // Initial value = all '0's
   while (n--)
   {
     byt = *s++;                   // Get next byte of message
     for (b=0; b<8; b++)
     {                             // Do CRC on this byte
       i = (crc & 1) /\ byt;
       crc >>= 1;
       byt >>= 1;
       if (i & 1)
          crc ^= 0xA001;
     }
   }
   return crc;                     // Return final CRC
}
```

In various embodiments, the format of messages to and from the surface device 120 and downhole devices may be as follows: <PREAMBLE>, <SYNC>, <TYPE>, <ADDRESS>, <SEQUENCE>, <CMD>, <DATA>, and <HASH>. Where:

| TYPE | SIZE (bits) | DESCRIPTION |
|---|---|---|
| PREAMBLE | 8 | Preamble depends on HFSK or FSK modulation |
| SYNC | 1 or 4 | Sync depends on HFSK or FSK modulation |
| TYPE | 8 | Device Type (0x01 = AS-100) |
| ADDRESS | 24 | Unique ID (address) of the Device (0xFFFFFF = broadcast) |
| SEQUENCE | 4 | Sequence number for returned data packet. Allows Master to sync the response with the transmitted packet. Occupies the upper 4 bits of the Seq/Cmd byte. |
| CMD | 4 | 16 allowable commands per device type. The command bits occupy the low 4 bits of the Seg/Cmd byte. |

-continued

| TYPE | SIZE (bits) | DESCRIPTION |
|------|-------------|-------------|
| DATA | 32 | Data specific to command |
| HASH | 16 | Hash of the data from the TYPE field thru the DATA field |

In various embodiments, <ADDRESS> may be a unique ID for each switch (e.g., within each of the plurality of downhole devices). In various embodiments <ADDRESS> may further identify the switch as being a general-purpose switch, a BRT (release tool), a Plug, and/or other device type. The second most-significant nibble indicates the switch's job assignment. For example, a BRT may be numbered with an 'E', such as 0x0E0000. In another example, a Plug may be numbered with an 'F', such as 0x0F0000. In another example, regular switches may be numbered from 0 thru B, such as 0x030000 or 0x0B0000. In this regard, the system may distinguish between the plurality of devices and their job assignment. It will be appreciated that the top nibble is not always zero. In various embodiments, the top nibble may be reserved for other purposes.

In various embodiments, the <CMD> set may be as follows:

| TYPE | VALUE | DESCRIPTION |
|------|-------|-------------|
| ID | 0x1 | Request device ID and status |
| POLL | 0x2 | Poll device for HW, FW versions |
| DSSE | 0x3 | Downstream Switch Enable. The AS-100 will reply to this command, and then sleep after activating the downstream switch. |
| ARM | 0x4 | Arm Detonator (activated safety hardware circuit to enable FIRE command) |
| UNARM | 0x5 | Dis-arm detonator. Returns to safe condition. |
| X-Y orientation | 0x6 | Gravitational force in the board's X and Y directions. |
| Y-Z orientation | 0x7 | Gravitational force in the board's Y and Z directions. |
| X-Z orientation | 0x8 | Gravitational force in the board's X and Z directions. |
| FIRE | 0xA | If Armed, the AS-100 will supply a frequency out to a secondary circuit enabling it for up to nn seconds. |
| FULL INFO | 0xD | Returns a long packet (18 bytes) with the following information: Temperature, Line Voltage, Vcc, flags, Versions, and X, Y, Z gravitational forces. |
| TEST | 0xE | Similar to Full Info command (0xD) except that the return signal is modulated at only 5 mA, not 20. |

In various embodiments, ID command may be sent as a broadcast in order to retrieve the unique ID from the topside device 120 to the corresponding addressable switch of any of the downhole devices. In response to the ID command, the addressable switch of the downhole device returns the device ID, wireline voltage, board temperature, and status. If the data value is 1, addressable switch may also perform a Down-Stream Switch Enable (DSSE) function of powering the next down-hole device and placing itself in the idle state. In this regard, the DSSE function facilitates a faster polling of all addressable switches on the line. In various embodiments, the <PACKET> format for the ID command may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device OR 0xFFFFFF for a broadcast request |
| SEQUENCE | 0x0-0xF | Sequence number sent by master and returned by device. Intended for matching request & response |
| CMD | 1 | Command (ID) |
| DATA | 0 or 1 | 0: Report and stay alive. 1: Report, connect to next down-hole device, and go to sleep (similar to DSSE command) |

In various embodiments, the <PACKET> format for the ID command response from the addressable switch may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x1 | Command (ID) |
| DATA | 0xVVTTssss | Where VV = volts @ 1 bit/volt, TT = temp @ 1 bit/degree (C). ssss = bitfield status (TODO) |

In various embodiments, the POLL command may be sent in order to request the hardware and/or firmware version of the addressable switch. The <PACKET> format for the POLL transmit may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x2 | Command (POLL) |
| DATA | 0x00000000 | |

In various embodiments, the POLL command response may return the version of the addressable switch device hardware and firmware. The <PACKET> format for the POLL command response may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x2 | Command (POLL) |
| DATA | 0xhhhhffff | Where hhhh = hardware version, ffff = firmware version |

In various embodiments, the DSSE command may be sent in order to enable a first addressable switch to allow downstream communications from the first addressable switch of a first downhole device to a second addressable switch of a lower downhole device in the toolstring. The <PACKET> format for the DSSE command may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x3 | Command (DSSE) |
| DATA | 0x00000000 | |

In various embodiments, the DSSE command response may return data indicating the automated switch has received the command and configured itself accordingly. In response to receiving the DSSE command the addressable switch may transmit the command response and enter a sleep mode. In various embodiments, the addressable switch may return from the sleep mode in response to first removing power to the tool string then reapplying power to the toolstring. The <PACKET> format for the DSSE command response may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by device. Intended for matching request & response |
| CMD | 0x3 | Command (DSSE) |
| DATA | 0x12345678 | Where any value other than 12345678 indicates lack of success in setting that switch |

In various embodiments, the ARM command may be sent in order to enable the arming circuit. In response to enabling the arming circuit, the addressable switch is allowed to perform the FIRE command in another packet. The <PACKET> format for the ARM command may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x4 | Command (ARM) |
| DATA | 0x000000nn | Where nn = the number of seconds to keep the circuit armed in order to allow the FIRE command to be operable |

In various embodiments, the ARM command response may return data indicating the addressable switch has set the arm circuit. The ARM command response <PACKET> format may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x4 | Command (ARM) |
| DATA | 0x87654321 | Where any value other than 87654321 indicates lack of success in setting that switch |

In various embodiments the UNARM command may be sent in order to disable the arming circuit. If the arm circuit is not currently set, the UNARM command may not be processed. The <PACKET> format for the ARM command may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x5 | Command (UNARM) |
| DATA | 0x00000000 | Data field is ignored |

In various embodiments, the UNARM command response may indicate that the arm circuit is no longer armed. The UNARM command response <PACKET> format may be as follows:

| TYPE | VALUE | DESCRIPTION |
|------|-------|-------------|
| TYPE | 0x01 | Addressable switch type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x5 | Command (UNARM) |
| DATA | 0x00000000 | Data field is returned as-is. |

In various embodiments, the X-Y orientation command may be sent in order to determine the addressable switch orientation in the X and Y planes. The <PACKET> format of the X-Y orientation command may be as follows:

| TYPE | VALUE | DESCRIPTION |
|------|-------|-------------|
| TYPE | 0x01 | AS-100 type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x6 | Command (X-Y) |
| DATA | 0x00000000 | Data field is ignored. |

Figure 5:
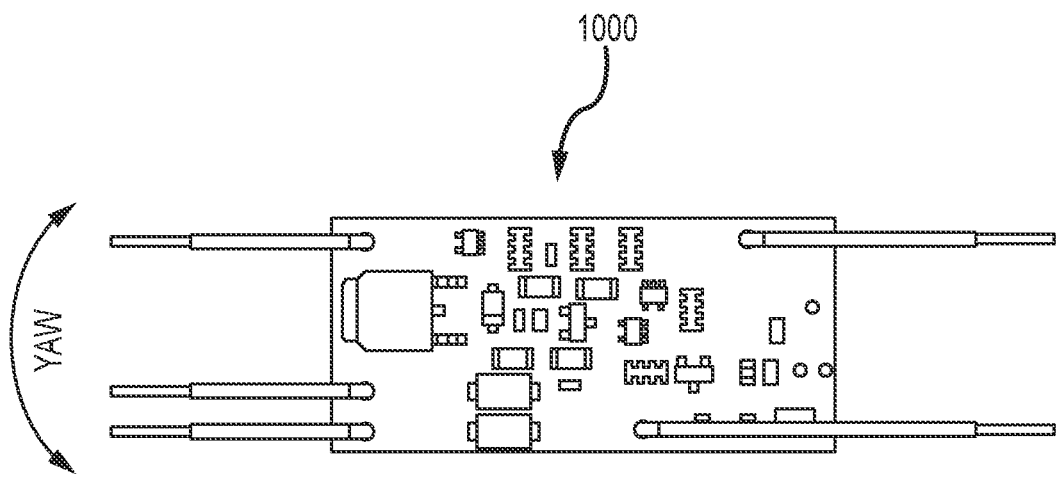
FIG. 5 is a top view of a circuit board in accordance with aspects of this disclosure.
Figure 6:
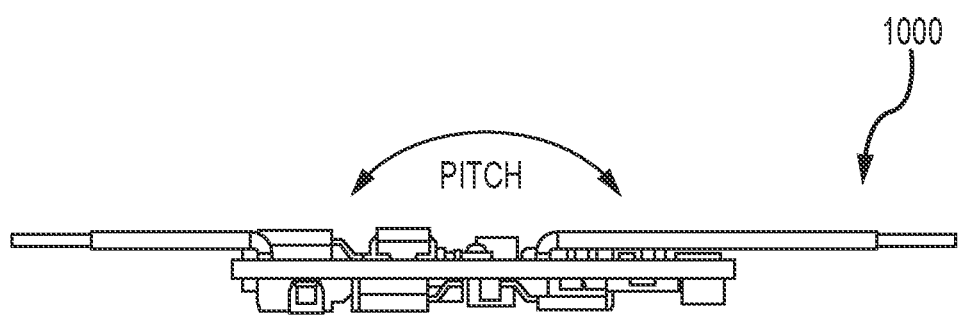
FIG. 6 is a side view of the circuit board of FIG. 5.
Figure 7:
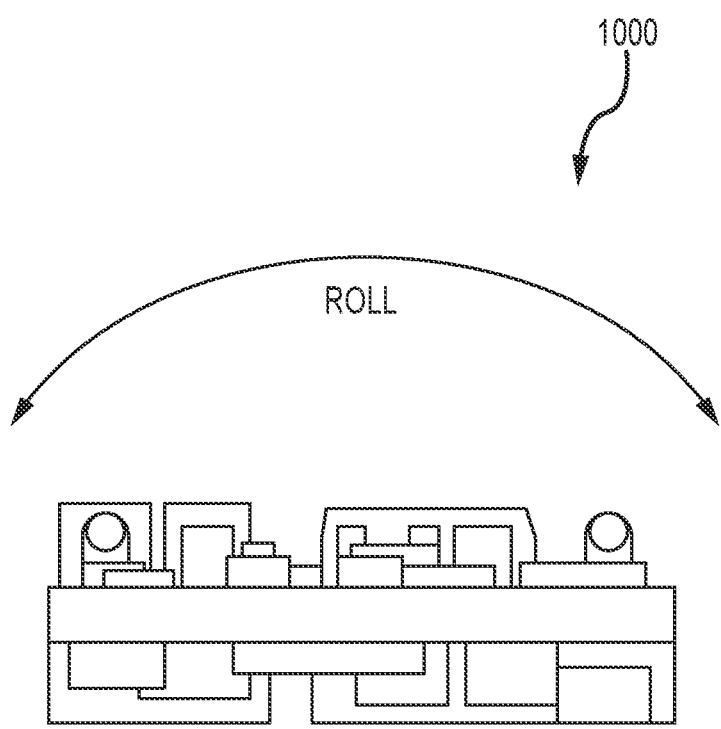
FIG. 7 is an end view of the circuit board of FIG. 5.

In various embodiments and with brief reference to FIGS. 5, 6, and 7, the X-Y Orientation command response may comprise data from the tilt sensor 412 or the other sensors 416 such as, for example, the strength of the gravitational vector which is perpendicular to the X plane and the Y plane of the circuit board 1000 of the addressable switch and/or the associated downhole device. In various embodiments, the values may range from between +16400 to −16400. In various embodiments, where the direction to the center of the earth is parallel to the plane, the returned value may be 0. The X axis may be through the long length of the circuit board 1000. The Y axis may be through the short width of the circuit board 1000. The <PAKCET> format for the X-Y Orientation command response may be as follows:

| TYPE | VALUE | DESCRIPTION |
|------|-------|-------------|
| TYPE | 0x01 | AS-100 type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x6 | Command (X-Y) |
| DATA | 0xYyyyXxxx | Xxxx = signed value of gravitational |

-continued

| TYPE | VALUE | DESCRIPTION |
|---|---|---|
| | | force in X. Yyyy = signed value of gravitational force in Y. |

In various embodiments, the Y-Z orientation command may be sent in order to determine the addressable switch orientation in the Y and Z planes. The <PACKET> format of the X-Y orientation command may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x7 | Command (Y-Z) |
| DATA | 0x00000000 | Data field is ignored. |

In various embodiments, the Y-Z Orientation command response may comprise data from the tilt sensor 412 or the other sensors 416 such as, for example, the strength of the gravitational vector which is perpendicular to the Y plane and the Z plane of the circuit board 1000 of the addressable switch and/or the associated downhole device. In various embodiments, the values may range from between +16400 to −16400. In various embodiments, where the direction to the center of the earth is parallel to the plane, the returned value may be 0. The Z axis may be mutually orthogonal to the X axis and the Y axis of the circuit board 1000. The <PAKCET> format for the Y-Z Orientation command response may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x7 | Command (Y-Z) |
| DATA | 0xZzzzYyyy | Yyyy = signed value of gravitational force in Y. Zzzz = signed value of gravitational force in Z. |

In various embodiments, the X-Z orientation command may be sent in order to determine the addressable switch orientation in the X and Z planes. The <PACKET> format of the X-Y orientation command may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0x0-0xF | Sequence number sent by master and returned by device. Intended for matching request & response |
| CMD | 0x8 | Command (X-Z) |
| DATA | 0x00000000 | Data field is ignored. |

In various embodiments, the X-Z Orientation command response may comprise data from the tilt sensor 412 or the other sensors 416 such as, for example, the strength of the gravitational vector which is perpendicular to the X plane and the Z plane of the circuit board 1000 of the addressable switch and/or the associated downhole device. In various embodiments, the values may range from between +16400 to −16400. In various embodiments, where the direction to the center of the earth is parallel to the plane, the returned value may be 0. The <PAKCET> format for the X-Z Orientation command response may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0x0-0xF | Sequence number sent by master, returned by device. Intended for matching request & response |
| CMD | 0x8 | Command (X-Z) |
| DATA | 0xZzzzXxxx | Xxxx = signed value of gravitational force in X. Zzzz = signed value of gravitational force in Z. |

In various embodiments, the FIRE command may be sent in order to enable the firing circuit. The ARM command must have been received and processed by the addressable switch prior to the FIRE command or the FIRE command will be ignored. In various embodiments, once the FIRE command has been received, the addressable switch may have a window of X seconds (passed as a parameter) to see the firing voltage for the detonator. After X seconds have elapsed the addressable switch may disable the firing circuit. The <PACKET> format of the FIRE command may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0x0-0xF | Sequence number sent by master and returned by device. Intended for matching request with response |
| CMD | 0xA | Command (ID) |
| DATA | 0x000000nn | Where nn = the number of seconds to keep the circuit active in order to allow the firing voltage time to ignite the detonator |

In various embodiments, in response to the FIRE command the addressable switch may return a FIRE command response indicating it has enabled the firing circuit. The <PACKET> format of the FIRE command response may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0x0-0xF | Sequence number sent by master and returned by device. Intended for matching request with response |
| CMD | 0xA | Command (ID) |
| DATA | 0xA5A5A5A5 | Where any value other than A5A5A5A5 indicates lack of success in enabling |

In various embodiments, the FULL INFO command may allow all addressable switch information to be retrieved via one command. In this regard, the full info command may save processing time and network resources by reducing the number of separate information requests for each subset of information. The input parameter may select wither the receiving addressable switch responds to the FULL INFO command with a reply, whether the addressable switch connects to an addressable switch of a lower downhole device (e.g., a next downstream device), whether the receiving addressable switch remains active, and/or the like. In various embodiments, the FULL INFO command response message may be 18 bytes (plus header and synch bits) and other command response messages may be 11 bytes. The FULL INFO command <PACKET> format may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0 | The sequence number for this command is ignored |
| CMD | 0xD | Command (ID) |
| DATA | 0x0000000n | Where n = 0-3, as follows: 0: Reply, connect downstream, and sleep 1: Reply, and stay active 2: No reply, but connect downstream and sleep 3: Standard switches: No reply, but stay active. Plug/Switches: No reply, and sleep |

In various embodiments, the FULL INFO command response may return the unique ID, device temperature data, wire line voltage, processor voltage, flag data, firmware version data, hardware version data, sensor data (e.g., gravimetric data, accelerometer data, tilt data), and/or the like. The FULL INFO command response may omit the TYPE, SEQUENCE, and CMD fields while the DATA field may be expanded. The <PACKET> format for the FULL INFO command response may be as follows:

| TYPE | VALUE | DESCRIPTION |
|---|---|---|
| ADDRESS | 0xHHMMLL | 24 bits identifying the unique id of device |
| Temperature | 0x00-0xFF | 8 bits of temperature. LSB = 1 degree C |
| Line Voltage | 0x00-0xFF | Wire Line voltage. LSB = 1 volt |
| Vcc | 0x00-0xFF | Processor voltage LSB = 17.2 mV |
| Flags | 0xbbbbbbbb | 8 bits of flags (TBD) |
| FW Version | 0x00-0xFF | Firmware version, 8 bits |
| HW Version | 0x00-0xFFFF | Hardware version, 16 bits |
| X | 0x00-0xFFFF | signed value of gravitational force in X |
| Y | 0x00-0xFFFF | signed value of gravitational force in Y |
| Z | 0x00-0xFFFF | signed value of gravitational force in Z |

In various embodiments, the TEST command allows all addressable switch information to be retrieved in one command. In this regard the TEST command tends save processing time and network resources by reducing the number of separate information requests for each subset of information. This command differs from the FULL INFO command, in that it replies with a 5 mA signal current instead of a 20 mA signal current. In this regard, the TEST command tends to facilitate safe top-side communications by reducing the potential for a leakage current to initiate ordnance. The input parameter may select wither the receiving addressable switch responds to the TEST command with a reply or not, whether the addressable switch connects to an addressable switch of a lower downhole device (e.g., a next downstream device), whether the receiving addressable switch remains active, and/or the like. In various embodiments, the TEST command response message may be 18 bytes (plus header and synch bits) and other command response messages may be 11 bytes. The TEST command <PACKET> format may be as follows:

| TYPE | VALUE | DESCRIPTION |
|---|---|---|
| TYPE | 0x01 | AS-100 type identifier |
| ADDRESS | 0xHHMMLL | 24 bits identifying the unique id of device |
| SEQUENCE | 0 | The sequence number for this command is ignored |
| CMD | 0xD | Command (ID) |
| DATA | 0x0000000n | Where n = 0-3, as follows: 0: Reply, connect downstream, and sleep 1: Reply, and stay active 2: No reply, but connect downstream and sleep 3: Standard switches: No reply, but stay active. Plug/Switches: No reply, and sleep |

In various embodiments, the TEST command response may return the unique ID, device temperature data, wire line voltage, processor voltage, flag data, firmware version data, hardware version data, sensor data (e.g., gravimetric data, accelerometer data, tilt data), and/or the like. The TEST command response may omit the TYPE, SEQUENCE, and CMD fields while the DATA field may be expanded. The <PACKET> format for the TEST command response may be as follows:

| TYPE | VALUE | DESCRIPTION |
|---|---|---|
| ADDRESS | 0xHHMMLL | 24 bits identifying the unique id of device |
| Temperature | 0x00-0xFF | 8 bits of temperature. LSB = 1 degree C |
| Line Voltage | 0x00-0xFF | Wire Line voltage. LSB = 1 volt |
| Vcc | 0x00-0xFF | Processor voltage LSB = 17.2 mV |
| Flags | 0xbbbbbbbb | 8 bits of flags (TBD) |
| FW Version | 0x00-0xFF | Firmware version, 8 bits |
| HW Version | 0x00-0xFFFF | Hardware version, 16 bits |
| X | 0x00-0xFFFF | signed value of gravitational force in X |
| Y | 0x00-0xFFFF | signed value of gravitational force in Y |
| Z | 0x00-0xFFFF | signed value of gravitational force in Z |

Although several example HFSK and FSK transport protocols have been disclosed herein, other formats for HFSK and FSK communication may be used.

Method

Figure 2:
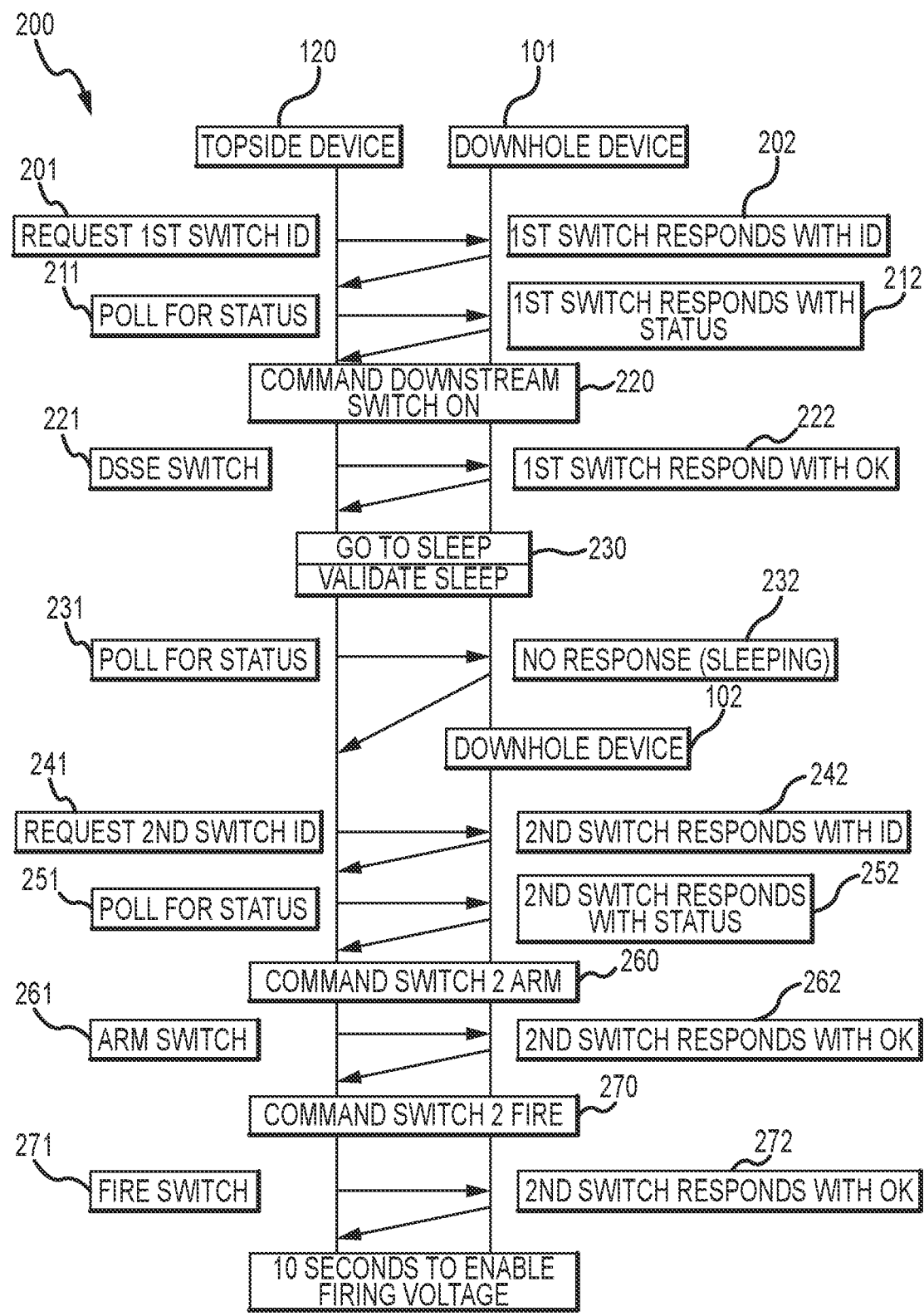
FIG. 2 is a diagram of a communications method for the well boring system of FIG. 1.

With reference now to FIG. 2A, an example method 200 of communicating with two or more downhole devices is illustrated. In this method 200, a first downhole device 101 is identified, polled, and commanded to open communication to a second downhole device 102. The second downhole device 102 is identified, polled, armed, and commanded to fire. This example method 200 may be described in more detail as follows.

Method 200 may comprise sending (201), from a surface device to a first switch associated with the first downhole device 101, an ID Command requesting a first switch identification (ID). Method 200 may further comprise the first switch responding (202) with its ID. The ID command may be sent as a broadcast for the purpose of retrieving the unique ID of the downhole device. If the ID command has a specific address, then the downhole device may report version information as a response.

Method 200 may further comprise sending (211), from the surface device to the first switch, a POLL Command requesting a first switch STATUS. Method 200 may further comprise the first switch responding (212) to the POLL command with the temperature, voltage, sensor, and bit status of the specific downhole device. By polling a first downhole device 101, a user may obtain the temperature, voltage, sensor, and bit status without removing the first downhole device 101 from the ground and with without disconnecting the first downhole device 101 from the rest of the system in order to test it.

Method 200 may further comprise the surface device 120 commanding (220) a downstream switch to turn on. In an example embodiment, a first switch is associated with downhole device 101 and a downstream switch is associated with a downhole device 102 that is next in line on the wireline. In this example embodiment, the surface device may command the first switch to turn on the downstream switch. Stated another way, the first switch (upstream switch) may be commanded to enable communication with the downstream switch. Thus, method 200 may comprise sending (221), from the surface device to the first switch, a Downstream Switch Enable (DSSE) Command that may be configured to cause the first switch to allow downstream communications from the first switch to a lower device in the toolstring. The method 200 may comprise the downhole device responding (222) with an OK, indicating that the instruction has been received and acted upon.

Method 200 may further comprise the surface device 120 confirming (230) that the first switch is in sleep mode, and then communicating with the downstream switch. For example, method 200 may comprise polling (231), from the surface device 120, the status of the first switch. Method 200 may comprise the first switch responding (232) with its status. In this example, it is expected that the first switch would now not respond because it is sleeping. If it responds, then an error signal may be generated and the system reset (power to the toolstring cycled off and on). This step helps ensure that communications only occur with one switch at a time.

Assuming no response is received, indicating that the first switch is sleeping, method 200 may further comprise sending (241), from a surface device to the downstream switch, an ID Command requesting the downstream switch identification (ID). Method 200 may further comprise the downstream switch responding (202) with its ID, as described above in connection with the first switch ID response.

Method 200 may further comprise sending (251), from the surface device to the downstream switch, a POLL Command requesting the downstream switch STATUS. Method 200 may further comprise the downstream switch responding (252) to the POLL command with the temperature, voltage, sensor, and bit status of the specific downstream downhole device.

Method 200 may further comprise the surface device 120 commanding (260) the downstream switch to arm. For example, method 200 may comprise sending (261), from the surface device 120 to the downstream switch, an ARM command. The method may further comprise the downstream switch responding (262) with OK to confirm success in arming at that switch.

Method 200 may further comprise the surface device 120 commanding (270) the downstream switch to fire. For example, method 200 may comprise sending (271), from the surface device 120 to the downstream switch, a FIRE command. The FIRE command is configured to enable the firing circuit. In an example embodiment, the ARM command will have been performed prior to this or the FIRE command will be ignored. Once the FIRE command has been received, the downstream switch will have a window of a programmable "nn" seconds to see the firing voltage for the detonator. This allows the firing voltage time to ignite the detonator. The method may further comprise the downstream switch responding (272) with OK to confirm success in enabling the fire circuit at that switch.

It is noted that these responses described herein may each include the unique ID of the device and a sequence for matching the request with the response. Therefore, the confirmation is secure, confirming that the intended switch got the intended message.

Thus, the methods disclosed herein facilitate controlling voltage directed to individual perforating guns in a downhole system. This select-arm-fire perforating method includes intelligent electronic circuits with unique digital addresses that can be addressed through simple telemetry systems. The system includes a surface panel (surface device) that can communicate with each of the downhole circuits on the individual downhole devices. Through the surface panel, the wireline operator can identify each of the gun modules, determine their status, and then control the circuits to direct voltage to a detonator connected to the appropriate digital switch.

Circuitry

In an example embodiment, the downhole device comprises an addressable switch (AS) 400. AS 400 may be electrically connected via wireline 410 to the surface device 120 (FIG. 1). AS 400 may also be electrically connected via the wireline 410 to another AS downstream from AS 400. AS 400 is configured to receive power and to communicate downlink/uplink with surface device 120 (FIG. 1). AS 400 is further configured to pass through power and communications to downstream addressable switches when AS 400 is in sleep mode.

In an example embodiment, AS 400 may comprise a downstream switch 401, a processor 402, safety circuitry 403, a charge pump 404, a detonate switch 405, a tilt sensor 412, and other sensors 416 (e.g., an accelerometer). Sensors such as the tilt sensor 423 and other sensors 416 may be in electronic communication with the processor 402 and configured to provide sensor data thereto. AS 400 may be electrically coupled to a detonator 406. Processor 402 is connected to wireline 410 to communicate uplink/downlink with surface device 120 (FIG. 1). In an example embodiment, safety circuitry 403 is a latch.

Processor 402 may be implemented as and may include one or more processors and/or one or more tangible, non-transitory memories and be capable of implementing logic. Each processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof. Processor 402 may be configured to implement various logical operations in response to execution of instructions, for example, instructions stored on a non-transitory, tangible, computer-readable medium configured to communicate with processor 402.

System program instructions and/or controller instructions may be loaded onto a non-transitory, tangible computer-readable medium having instructions stored thereon that, in response to execution by the processor 402, cause the processor 402 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In addition, AS 400 may be configured to sense one or more of roll, pitch and yaw by incorporating an accelerometer integrated circuit IC chip, or other suitable sensor(s) (e.g. sensors 416 and/or tilt sensor 412) on the printed circuit board assembly 1000, which is shown in FIGS. 5-7. Circuit board 1000 is positioned in the downhole device, which is preferably a gun tube, or inside of the outer casing surrounding the gun tube. In various embodiments, processor 402 may be configured to determine the position of the downhole device inside of a wellbore with respect to one or more of: yaw (shown in FIG. 5), pitch (shown in FIG. 6), and roll (shown in FIG. 7) of the circuit board 1000 based on inputs from the accelerometer or other sensor(s). In various embodiments and with additional reference to FIGS. 5, 6, and 7. Processor 402 may calculate the pitch (rotation about the Y axis) information based on the equation: Pitch (degrees)=57.296*atan 2 (X, sqrt(Y*Y+Z*Z)). Processor 402 may calculate the roll (rotation about the X axis) information based on the equation: Roll (degrees)=57.296*atan 2 (Y, Z). In this regard, the AS 400 may be configured to generate orientation data such as roll, pitch, and yaw, in response to receiving data from the sensors. The measured position and orientation may be used to determine the shape charge angle and position prior to firing the charges, as further described in application Ser. No. 16/293,532. The measured position information can be relayed through a wired connection or wirelessly to a human or machine operator, which may be surface device 120. The position of the downhole device can preferably be altered by the operator, such as by sending a signal to circuit board 1000, which could then operate a motor on one or both ends of the downhole device to move the downhole device in the wellbore.

Arm Circuitry

In an example embodiment, processor 402 is further connected to safety circuitry 403. In this example embodiment, processor 402 is configured to send a signal to safety circuitry 403 to arm the detonators. Safety circuitry 403 is configured to power up in the reset (safe) state. The removal of the signal, or a reset of the processor, will reset the safety circuit. In an example embodiment, the safety circuitry 403 is a latch circuit, and the latch circuit may be 'set' by the ARM command before the FIRE command is sent.

Special Fire Circuitry

In an example embodiment, processor 402 is further connected to charge pump 404. Charge pump 404, in an example embodiment, may comprise a capacitor, a charging resistor, and a bleeding resistor. Charge pump 404 is configured to begin charging the capacitor when the latch is armed and a FIRE command is received. Charge pump 404 will discharge the capacitor through bleeding resistor, if the safety circuitry 403 is ever disarmed.

When the FIRE command is received, and safety circuitry 403 has been previously armed, the charge pump 404 is energized by the processor for a programmable number of seconds, as prescribed in the FIRE command. After this, the processor may be configured to shut down and the firing transistor may be disabled with 50 milliseconds or for any other suitable period. If the top-side control rack does not ignite the detonator before the programmable "nn" seconds are complete, then firing is not possible and the system is again 'safe'. The system may be power-cycled and re-armed before another FIRE command can be successful.

If, at the time a FIRE command is received, safety circuitry 403 is not armed, the charge pump is prevented from functioning. In addition, detonate switch 405 not only requires the charge pump voltage to be above 4 volts, but also requires the wireline supply voltage, on wireline 410, to be greater than 60 volts dc. A wireline voltage of less than 60 volts dc keeps a firing transistor (in the detonate switch 405) disabled, even if the safety circuitry 403 and charge pump 404 have been properly driven.

Therefore, AS 400 forces the firing transistor into the disabled state, even if it has previously received the proper ARM and FIRE commands. This prevents an accidental firing of downhole device 101 when further down-hole devices are being powered.

Moreover, AS 400 may comprise a temperature sensing circuit. The temperature sensing circuit may communicate with processor 402, which may prevent firing if the sensed temperature is less than a set point temperature (e.g., if the temperature is less than 150 degrees F.). Moreover, any suitable temperature threshold can be used. The point is that the temperature will be relatively high when the device is underground, so it increases safety to prevent detonation when the temperatures are at ambient temperatures, but rather to allow detonation only when the device is at elevated temperature and therefore, underground.

In addition, AS 400 may be configured to sense whether a 50 ohm load is on the detonator, and to only allow firing if that load is present. The AS 400 may further be configured to test for continuity between the wires dedicated to the detonator. For example, the AS 400 safely determines, with very low current, if the detonator is connected or not. This is needed to remain within the safe operating area (SOA) of the detonator.

In addition, AS 400 may be configured to log and transmit detonation or g-force data received from downstream addressable switches' accelerometers before they are destroyed in the detonation process. Typical accelerometer measurements may include static or dynamic acceleration forces, vibrations, or continuous forces e.g. gravity. These data points may be evaluated and may enable more robust electronic designs to be created.

Figure 10:
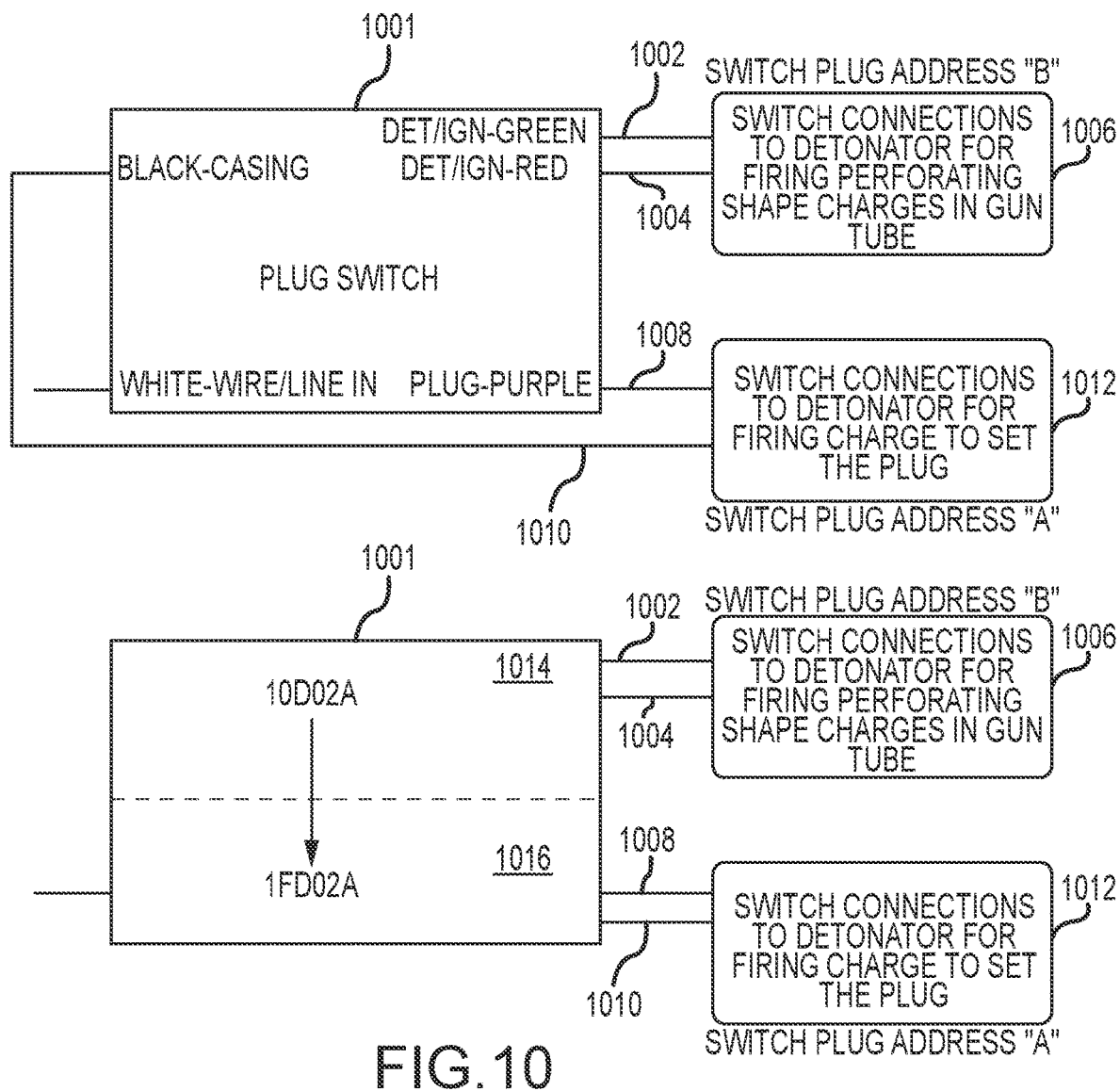
FIG. 10 is a block diagram of an addressable switch in accordance with aspects of this disclosure.

In addition and with reference to FIG. 10, an alternative configuration of an addressable switch 1001 is illustrated. Addressable switch 1001 comprises various features, materials, geometries, construction, manufacturing techniques, and/or internal components similar to AS 400. Addressable switch 1001 differs in that it may be configured as a safe and arm device for multiple detonators, wherein different detonators may be positioned in different devices, and to enable independent control of the detonators by the addressable switch 1001. For example, two wires (1002, 1004) may be coupled to and in electronic communication with a first detonator 1006 of a first ordnance device such as a gun tube or a plug. Two other wires (1008, 1010) may be coupled to and in electronic communication with to a second detonator 1012 of a second ordnance device, such as a gun tube or plug. The addressable switch 1001 may be configured to provide a first unique ID 1014 and a second unique ID 1016.

For example, in response to the TEST or the FULL INFO command, the addressable switch 1001 may return the first unique ID 1014 "10D02A" and the second unique ID 1016 "1FD02A". In this regard the ARM and FIRE commands may be sent separately to each unique ID and thereby enable independent control of the detonators (1006, 1012). In various embodiments, an addressable switch 1001 may be mechanically coupled to a first downhole device (e.g., 103) and in electronic communication with both the first downhole device and a second downhole device (e.g., 104), which is lower down the tool string than the first downhole device. The first detonator 1006 may be positioned in and configured to actuate an ordnance device in the first downhole device (e.g., 103) and also configured to actuate (also referred to as firing or exploding the detonator) the second detonator 1012 in the second ordnance device (such as a plug) in a second downhole device (e.g., 104) that is lower down the tool string than the first downhole device. In one embodiment the second downhole device is immediately below the first downhole device. In this regard, the addressable switch 1001 may be configured to independently control an ordnance device of the first downhole device (e.g., 103) and an ordnance device of the second downhole device (e.g., 104) via commands assigned to the first unique ID 1014 and the second unique ID 1016.

For example, the addressable switch 1001 may be positioned in the first downhole device and be operated to first send a signal to fire the detonator in the second downhole device, which may be immediately below the first downhole device (i.e., there are no other downhole devices between the first downhole device and the second downhole device), in order to set a plug. Then addressable switch 1001 can send a second signal to actuate the detonator in the first downhole device, such as a gun tube, in which addressable switch is positioned. The signals to the two detonators may also be sent simultaneously. And, signals from an addressable switch according to this disclosure may be sent to more than two detonators causing the detonators to fire.

Figure 13:
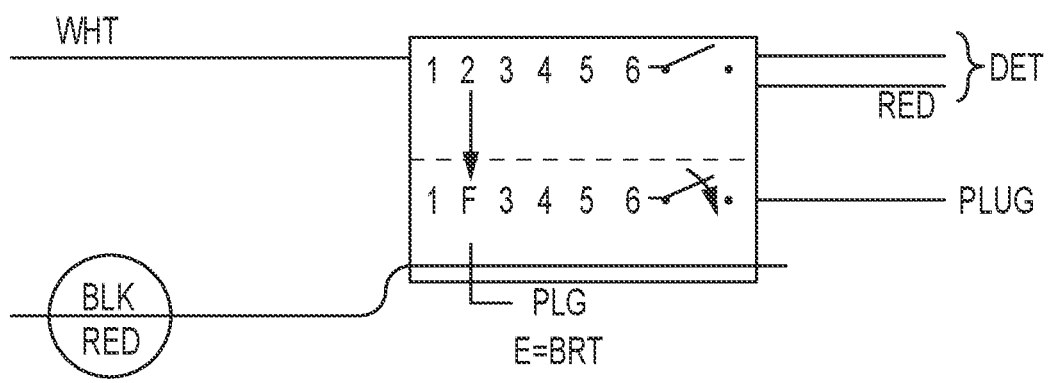
FIG. 13 illustrates a logical configuration of an addressable switch in accordance with aspects of this disclosure.

In various embodiments and with combined reference to FIGS. 10 and 13, in response to at least one of the ID, TEST or FULL INFO command from the surface device 120, the addressable switch 1001 may "wake up" from a low current sleep state and report its unique IDs (unique hexadecimal addresses) back to the surface device 120 in the format of "123456" (e.g., 10D02A and 1FD02A as shown in FIG. 10). The first hexadecimal address (e.g., 10D02A) may be replicated and modified by changing the second placeholder to an "F", or (1FD02A) in this regard the system may generate the second unique ID.

Using Systems, Devices, and Methods of This Disclosure

In various example embodiments, the system and method improve reliability and safety. For example, during pre-run checks, usually done above ground, the addressable switches can be polled with a test panel to verify their status and verify circuit integrity to insure the tool assembly is wired correctly and all components are working properly. Each of the addressable switches can also be checked while being positioned in the wellbore to continuously verify the integrity of the electrical circuit. Thus, the addressable switches can be addressed, and their status verified at any point before by surface test panels, or when positioned in the wellbore by the wireline communications system. In the event of a system failure (leaking cable-head, shorted wireline, failed casing collar locator (CCL), pinched gun wire, bad switch, etc.), the tool assembly can be repaired before pumping to total depth and attempting to set a plug or fire a gun. This contrasts with traditional pressure switches, which are passive and cannot be tested above ground or checked downhole.

Figure 8:
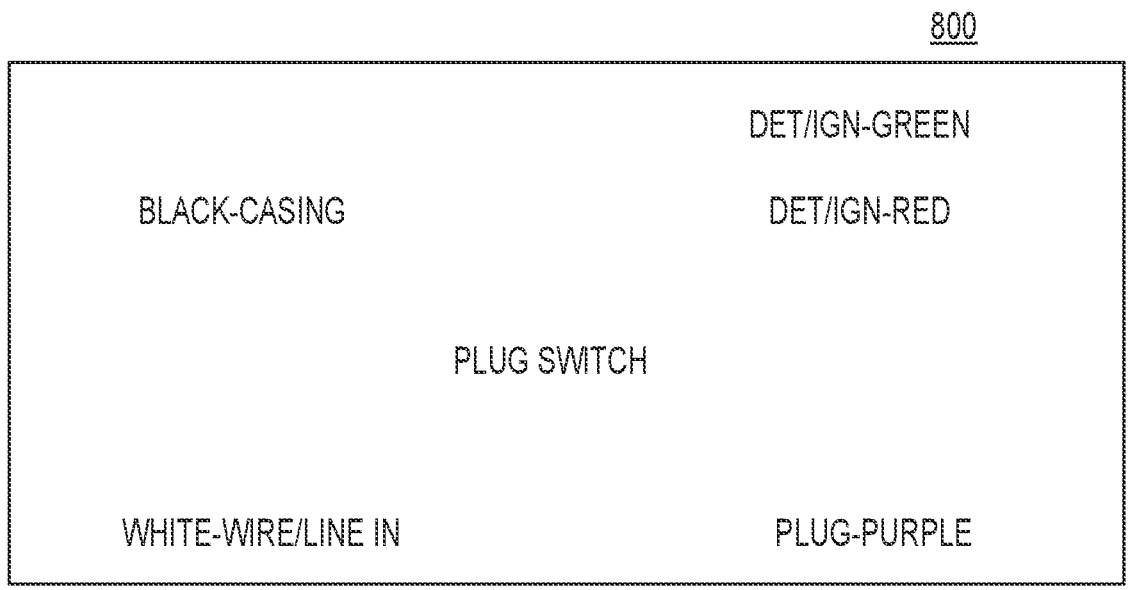
FIG. 8 is a placard of an addressable switch in accordance with aspects of this disclosure.
Figure 9:
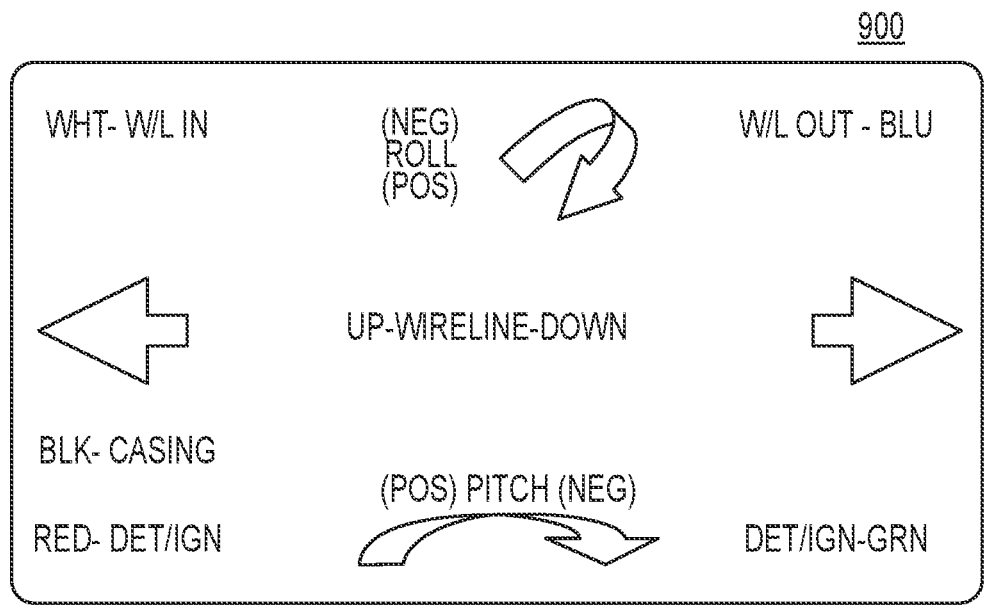
FIG. 9 is a placard of an addressable switch in accordance with aspects of this disclosure.

The system may include one or readable placards (800, 900) (shown in FIG. 8 and FIG. 9) describing the electrical configuration, installation, and/or operation of system elements such as the addressable switches in the downhole devices. The placards (800, 900) may be coupled to an exterior surface of the addressable switch and include information as to position on the wireline, pitch axis location, roll axis location, signal wire position, connection type information, and/or the like. In various embodiments and as illustrated in the figures, the placards (800, 900) may facilitate proper installation and orientation of the addressable switch (400, 1001) in a downhole device 1200.

The system and method may accomplish one or more of the following: reduce failed runs, minimize the potential for stuck tools, and significantly reduce non-productive time. Also, sticking and leaving tool strings in horizontal wells can be expensive, and POOH (pulling out of hole) after a failed pump-down run to bottom on a long lateral can be very undesirable.

Furthermore, a system, device, and/or method may further provide real-time feedback of the detonation event. This helps the wireline operator know with some certainty if a plug sets or a perforating gun fires. Prior techniques to verify downhole detonation included surface measurements that were not reliable. This downhole shot detection, unlike the pressure switch technology that fired bottom up in sequence, allows the wireline operator to bypass a failed gun and shoot the next gun in sequence. A detonation event may occur with one less gun, and this may be adequate to complete a stage of detonation. By being able to detonate even with a failed gun on the toolstring, the number of failed runs may be reduced and run efficiency may be improved.

Therefore, in various example embodiments of the system, devices, and/or method disclosed herein, any one or more of the following benefits may be realized.

Plug and perforation operations are able to safely control and selectively apply voltage to individual downhole devices in a downhole wireline assembly with single trip wireline runs through use of addressable switches. Addressable switches, according to this disclosure, may provide the ability to block inadvertent current from the electrical detonators in the tool string. This may include one or more sources of voltage: stray, RF signal and/or human error. The switches, when integrated with standard detonators, may be certified RF safe, so a RF-free perimeter at the well-site may be unnecessary. This may reduce the amount of time it takes to set up a site prior to drilling.

The wireline operator may communicate with and control each of the sections of the downhole assembly. The new switches may be checked before and during the wireline run, thus improving reliability. Real-time shot detection may give the operator immediate feedback on whether plugs have set or guns have fired. Individual gun sections may be skipped in the event any section fails to detonate, which may prevent a mis-run and result in better efficiency.

In accordance with various embodiments, the systems and methods described herein can improve reliability, safety and efficiency in making and using the system 100. In an example embodiment, the system 100 can reduce costs attributable to failed runs, reduce costs associated with tools being stuck, reduce fishing and well remediation, generate a higher rate of return, and prevent surface detonations and loss of life.

In accordance with various embodiments, the system may be tested above ground without removing any devices from the system. Similarly, the system may be tested below ground. A downhole device may remain on the toolstring and provide various data to a user above ground as to the status of the downhole device and whether it has detonated. By being able to test downhole devices on the line, the downhole device as tested may be the downhole device as used. In other words, in an example embodiment, no connections changes are made between above ground testing, below ground testing, and operating a downhole device, which may provide greater reliability of a downhole device.

Figure 11:
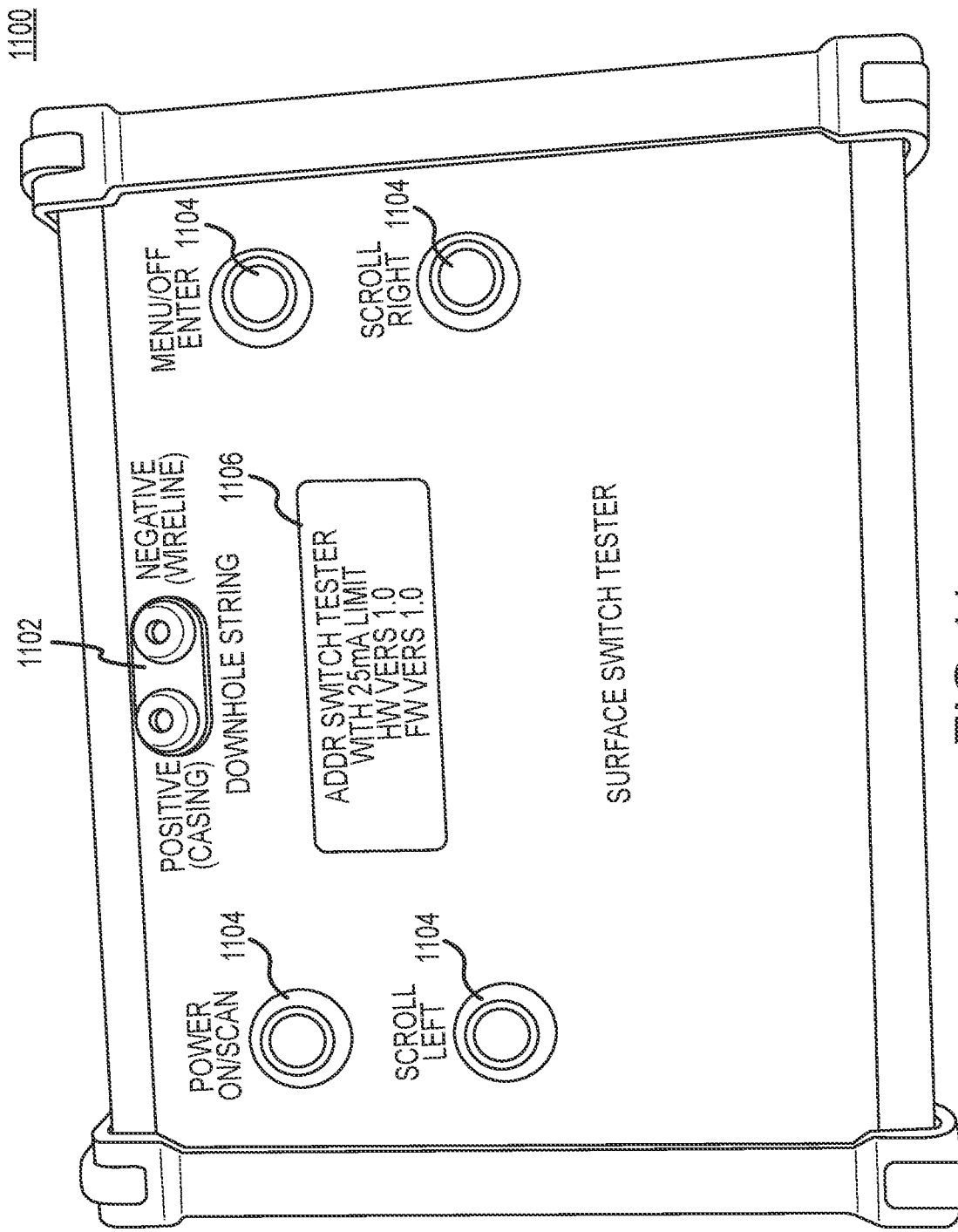
FIG. 11 is a testing device in accordance with aspects of this disclosure.
Figure 12:
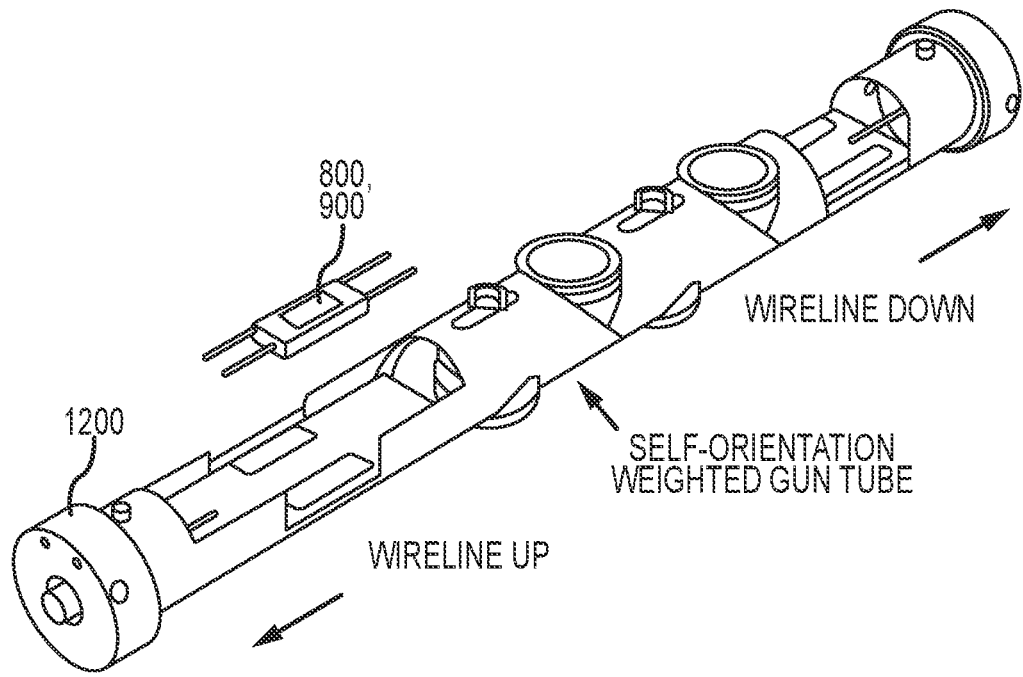
FIG. 12 illustrates coupling an addressable switch to a downhole device in accordance with aspects of this disclosure.
Figure 12:
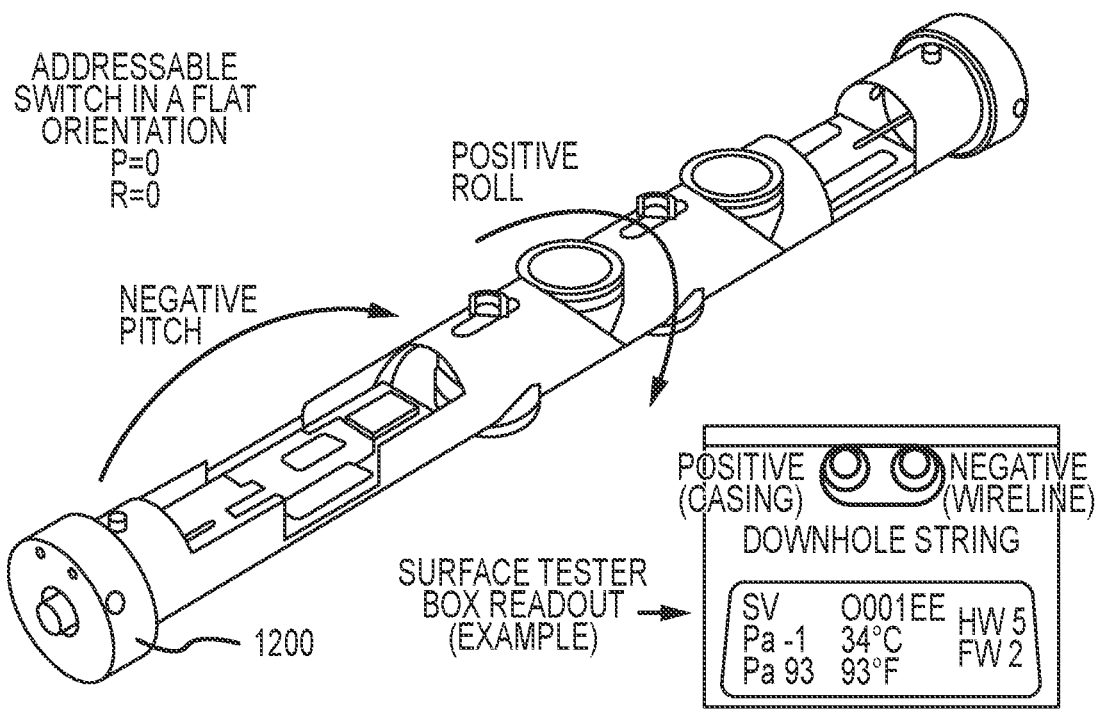

In various embodiments, and with reference to FIG. 11 a testing device 1100 is illustrated. In various embodiments, surface device 102 may include the testing device 1100. Testing device 1100 includes an electronic interface 1102, buttons 1104, and a display 1106. Electronic interface 1102 may be electrically coupled to the wireline and the casing and thereby enable communication with the downhole devices. Commands as described above may be sent from the testing device 1100 to the downhole devices in response to actuating one or more of the buttons 1104. For example, the testing device 1100 may be configured to send the TEST command to an addressable switch of a downhole device. The Testing device 1100 may receive the TEST command response message from the addressable switch. In response to receiving the TEST command response message, the testing device 1100 may display data from the message via the display 1106 such as, for example, the unique ID, the temperature data, orientation data (e.g. roll, pitch, yaw, accelerometer data) and or the like.

The integrated protection circuits may block the unintended flow of electricity through an addressable switch and may stop inadvertent voltage from initiating a detonator.

A method of communicating between a surface device and two or more downhole devices is disclosed herein. The method may comprise identifying a first downhole device; polling the first downhole device; commanding opening of communication to a second downhole device; identifying the second downhole device; polling the second downhole device; arming the second downhole device; and commanding the second downhole device to fire, wherein the communicating between the surface device and the two or more downhole devices occurs via a Hopped Frequency Shift Keying (HFSK) voltage-modulated signal.

Having thus described different embodiments, other variations and embodiments that do not depart from the spirit of this disclosure will become apparent to those skilled in the art. The scope of the claims is thus not limited to any particular embodiment, but is instead set forth in the claims and the legal equivalents thereof. Unless expressly stated in the written description or claims, the steps of any method recited in the claims may be performed in any order capable of yielding the desired product. No language in the specification should be construed as indicating that any non-claimed limitation is included in a claim. The terms "a" and "an" in the context of the following claims are to be construed to cover both the singular and the plural, unless otherwise indicated.

What is claimed is:

1. A system comprising:
   a surface device;
   a downhole device; and
   a wireline communication system including an addressable switch coupled to the downhole device, wherein the addressable switch comprises a first unique ID and a second unique ID;
   wherein downlink communication between the surface device and the downhole device occurs via Hopped Frequency Shift Keying (HFSK) voltage-modulated signals, and wherein the addressable switch is configured to generate orientation data and communicate the first unique ID to the surface device in response to a signal from the surface device and is configured to transmit the second unique ID in response to the signal from the surface device; and
   wherein the addressable switch is configured as a safety circuitry to arm a first detonator of the downhole device and a second detonator of a second downhole device, wherein the first unique ID is associated with the first detonator and the second unique ID is associated with the second detonator,
   wherein a transport layer comprises a bit-stream with a Preamble, Sync, and Data Packet patterns, wherein the Data Packet pattern consists of Type, Address, Sequence, Command, Data, and Hash fields, wherein the Command comprises one of following: request device ID and version; Poll device for status, Downstream Switch Enable (DSSE); ARM Detonator; and FIRE, wherein the HFSK alternates between four different frequencies, F1, F2, F3, and F4, with a change in frequency indicating a new bit, and wherein the frequencies F1 and F2 are utilized for a Zero bit, and wherein the frequencies F3 and F4 are utilized for a One bit, excepting during the Preamble and the Sync patterns.

2. The system of claim 1, wherein uplink communication between the downhole device and the surface device occurs via Frequency Shift Keying (FSK) current-modulated signals.

3. The system of claim 1, wherein the addressable switch is configured to generate the orientation data based on input from one or more sensors and to transmit the orientation data to the surface device.

4. The system of claim 1, wherein the surface device is a surface controller, wherein the surface controller is a master controller, and wherein the downhole device is a slave.

5. The system of claim 1, wherein the wireline communication system comprises a single wire downhole and a case or chassis for a return current path.

6. The system of claim 1, wherein the downlink communication uses voltage modulation at the four different frequencies.

7. The system of claim 1, wherein the surface device is configured to send downlink communication signals to the downhole device, wherein the surface device is a master controller configured to receive and display the orientation data from the downhole device.

8. The system of claim 7, wherein the downlink communication uses voltage modulation at the four different frequencies.

9. The system of claim 1, wherein the addressable switch is positioned in the downhole device.

10. The system of claim 1, wherein the second downhole device comprises a plug and the downhole device is a gun tube.

11. The system of claim 1, wherein there are no downhole devices between the downhole device and the second downhole device.

12. The system of claim 1, wherein the addressable switch is configured to (a) first transmit the second unique ID to the second detonator in order to actuate the second detonator, and (b) after transmitting the second unique ID, transmitting the first unique ID to the first detonator in order to actuate the first detonator.

13. An addressable switch comprising:
   an electrical input and an electrical output, the electrical input being configured to communicate with a surface controller when a unique address is received by the electrical input from the surface controller;
   a downstream switch configured to connect or disconnect the electrical input to the electrical output when the unique address is received by the electrical input;
   a safety circuitry;
   a processor in electrical communication with the downstream switch and the safety circuitry;
   a tangible, non-transitory memory configured to communicate with the processor, the tangible, non-transitory memory having instructions stored thereon that, in response to execution by the processor, cause the processor to perform operations comprising:

receiving, by the processor, a signal from the surface controller;

sending, by the processor, the signal to the safety circuitry to arm a detonator, wherein the unique address is associated with the detonator; and generating, by the processor, orientation data, wherein downlink communication between the surface controller and the electrical input occurs via Hopped Frequency Shift Keying (HFSK) voltage-modulated signals;

wherein a transport layer comprises a bit-stream with a Preamble, Sync, and Data Packet patterns, wherein the Data Packet pattern consists of Type, Address, Sequence, Command, Data, and Hash fields, wherein the HFSK alternates between four different frequencies, F1, F2, F3, and F4, with a change in frequency indicating a new bit, and wherein the Command comprises one of the following: request device ID and version; Poll device for status; Downstream Switch Enable (DSSE); ARM Detonator; and FIRE; and wherein the frequencies F1 and F2 are utilized for a Zero bit, and wherein the frequencies F3 and F4 are utilized for a One bit, excepting during the Preamble and Sync patterns.

14. The addressable switch of claim 13, wherein the downlink communication uses voltage modulation at the four different frequencies.

15. The addressable switch of claim 13, further comprising an oscillator configured to be tuned to a reference signal, wherein the preamble pattern provides the reference signal based on a minimum frequency deviation from a plurality of frequency deviations between an expected frequency from the surface controller and an internally generated frequency in the oscillator.

\* \* \* \* \*